3,372,052
WATER REPELLENT FOR MASONRY
Matt C. Polniaszek, Lancaster, N.Y., assignor to Union
Carbide Corporation, a corporation of New York
No Drawing. Filed Dec. 24, 1964, Ser. No. 421,092
30 Claims. (Cl. 117—72)

ABSTRACT OF THE DISCLOSURE

A water repellent for masonry comprising (1) a liquid diluent such as water, (2) a water soluble fluosilicate, and (3) a polysiloxane.

---

This invention relates to a process for rendering masonry water repellent, and to compositions of matter suitable for such purpose.

It is well known that water repellency may be conferred upon masonry by treating the surfaces with various substances to render them repellent to liquid water, while at the same time maintaining their permeability to water vapor. Such methods are advantageous since they enable water vapor locked within the masonry to evaporate.

Despite certain deficiencies, the use of polysiloxanes as water repellents on masonry has been established for some years. Applied either as organic solvent solutions or aqueous alkaline solutions, silicone masonry water repellents do not seal the pores, but coat them with a hydrophobic film. This film prevents liquid water from entering the pores of the masonry by normal capillary action due to the high contact angle produced by the film, however, it still permits the normal passage of water vapor.

Polysiloxane resins have been used to obtain such water repellency. These resins, which on curing produce films varying in nautre from soft and flexible to hard and brittle, depending on the ratio of difunctional to trifunctional siloxane units, are normally marketed as hydrocarbon solutions. They normally have free silicon-bonded hydroxyl groups available for reaction which is induced by the use of catalysts such as zinc naphthenate or triethanolamine. A serious disadvantage in the use of such conventional water repellents, however, is the fact that they must be applied from an organic solvent solution, the use of which is known to be accompanied by many hazards, such as their toxicity, flammability and high cost.

A proposed solution, under circumstances where use of organic solvents and their associated hazards is to be avoided, has been the use of aqueous alkali metal siliconates. Although this system provides a water soluble treatment, this attractive feature is more than cancelled out by the extreme alkalinity of the aqueous solution. The high alkalinity requires that workers, as well as wood, paint, metal and glass objects be protected from the solution when it is applied.

Thus, it can be seen that the prior art silicone (polysiloxane) water repellents are not entirely satisfactory because they require either the use of organic solvents or the use of highly alkaline and consequently hazardous aqueous solutions. In addition, the prior art siliconate type water repellents are not entirely satisfactory because they tend to discolor or stain limestone masonry to some extent.

It is an object of this invention to produce a water repellent composition which when applied to a masonry surface leaves a clear, substantially invisible and stain-free water repellent surface. It is another object of this invention to produce a water repellent composition for masonry which can, if desired, be applied from an aqueous solution; which eliminates the need for handling highly caustic or toxic solutions; which shows good resistance to weathering; and which does not stain the masonry.

These and other objects are accomplished by rendering masonry water repellent by applying a coating of a polysiloxane and a fluosilicate. The invention may be practiced in several ways. In the most preferred embodiment, the masonry may be rendered water repellent by a one step process which consists of applying to the masonry surface a solution comprising a fluosilicate and a polysiloxane. The solution is preferably aqueous, but it may be organic if desired. Alternatively, a two step method of application may be used whereby a solution of a fluosilicate is applied first, and after it is dried, a solution of a polysiloxane is applied over it.

The processes and compositions of the present invention are applicable to substantially any type of masonry surface. Thus, the present invention may be used to render the surface of limestone, sandstone, cement block, marble, mortar, gypsum, granite, common red brick as well as highly glazed brick water repellent. It is particularly useful for rendering limestone surfaces water repellent. Application of the solutions may be by brushing, dipping, spraying or any other suitable means.

Although completely aqueous systems are preferred, organic solvent systems may also be used, if desired. When a one step coating method is used, the fluosilicate is first dissolved in water, and the polysiloxane is similarly dissolved or dispersed in water. When the polysiloxane resin is dissolved or dispersed in an organic solvent, then the fluosilicate must first be dissolved in a small amount of water and then in a "coupling" solvent so that when the fluosilicate solution is mixed with the organic polysiloxane solution a compatible mixture will result. Suitable "coupling" solvents are high boiling OH containing solvents such as n-butanol and glycol ethers such as methyl "Cellosolve," ethyl "Cellosolve."

Suitable organic solvents for the polysiloxane resins are ketones, esters and hydrocarbons. Although ketones such as methyl isobutyl ketone and methyl ethyl ketone, and esters such as "Cellosolve" acetate and n-butyl acetate are suitable solvents, they are not preferred because of toxicity and flammability problems. Aliphatic hydrocarbons such as mineral spirits are the preferred organic solvents for the water repellent compositions. In some instances, depending upon the polysiloxanes resin used, aromatic hydrocarbons or mixtures of aliphatic and aromatic hydrocarbons can also be used. Benzene, toluene and xylene are suitable aromatic hydrocarbons. As noted before, where the final vehicle for the polysiloxane is an organic solvent, the fluosilicate must first be dissolved in a minimum quantity of water, then in a "coupling" solvent and then in the organic solvent solution of the polysiloxane.

Suitable fluuosilicates for use in the present invention include all water soluble metal fluosilicates as well as ammonium fluosilicate. By soluble is meant that the fluosilicate must have a solubility equal to at least 0.1 gm. of the fluosilicate per 100 ml. of water. Suitable metal. fluosilicates include:

$CdSiF_6 \cdot 6H_2O$
$CaSiF_6$
$Cs_2SiF_6$
$CoSiF_6 \cdot 6H_2O$
$CuSiF_6 \cdot 4H_2O$
$CuSiF_6 \cdot 6H_2O$
$FeSiF_6 \cdot 6H_2O$
$Fe_2(SiF_6)_3$
$PbSiF_6 \cdot 2N_2O$
$PbSiF_6 \cdot 4H_2O$
$Li_2SiF_6 \cdot 2H_2O$
$MgSiF_6$ $MgSiF_6 \cdot 6H_2O$
$MnSiF_6 \cdot 6H_2O$
$NiSiF_6 \cdot 6H_2O$
$K_2SiF_6$
$Rb_2SiF_6$
$Ag_2SiF_6 \cdot 4H_2O$
$Na_2SiF_6$
$SrSiF_6 \cdot 2H_2O$
$ZnSiF_6 \cdot 6H_2O$ It should be apparent from the above that any inorganic water soluble salt of fluosilicic acid is operable in the present invention provided that it is soluble at least to the extent of 0.1 gm./100 ml. of water. Those fluosilicates which are the most highly soluble are preferred; the most preferred fluosilicate being zincfluosilicate.

The polysiloxanes useful in the present invention are known materials. They may be either fluid or resinous substances. Structurally they may be linear or crosslinked. The essential feature of the polysiloxanes is their ability to form water repellent films on curing. The water repellency of the films is insured by an abundance of hydrocarbon groups on the —Si—O—Si— chain, and the curability of the molecules to a film forming material is accomplished by having silicon bonded H, OR or OH groups attached along or terminating the —Si—O—Si— chain. Additionally, the polysiloxane must adhere well to the surface being coated. While not wishing to be bound by any theory, it is believed that the improved water repellency achieved by the methods and compositions of the present invention is attributable primarily to better adherence of the polysiloxane to the coated substrata caused by the presence of a fluosilicate.

The polysiloxanes useful in the present invention can be represented by a structure consisting essentially of (a) 5 to 100 mole percent of units represented by the structural formula:

(A) 

where R is a saturated or unsaturated, aliphatic or aromatic monovalent hydrocarbon group, X is selected from the group consisting of H, OH or OR groups, $a$ has a value of 1 to 2 inclusive, $b$ has a value of 1 to 2 inclusive, and the sum of $(a+b)$ has a value of 2 to 3 inclusive, and (b) 0 to 95 mol percent of units represented by the structural formula.

(B) 

where R has the same meaning as above and $c$ has a value of 1 to 3 inclusive.

In order to obtain optimum surface penetration and water repellency, it is preferred that R in the above formulas be a saturated aliphatic hydrocarbon group containing 1 to 5 carbon atoms, i.e. methyl, ethyl, propyl, butyl and amyl groups. However, other illustrative hydrocarbon groups from which R may be selected include octadecyl, cyclohexyl, cyclopentyl. vinyl, butenyl, cyclohexenyl, naphthyl, tolyl, xylyl and benzyl.

A preferred class of polymers composed of units represented by Formulas A and B above may be represented by formula:

(C)     $R_3SiO(R_2SiO)_n(RHSiO)_mSiR_3$ where R has the same meaning as above, preferably R is a saturated aliphatic hydrocarbon group containing 1 to 5 carbon atoms, $n$ may have any average value from 0 to about 5,000, $m$ may have any average value from 1 to about 300, and wherein at least 5 mole percent of the siloxane groups are RHSiO groups.

For example, if in Formula C, $n=0$, $m=40$ and all R's are methyl, the polysiloxane, hereafter labeled Siloxane I is:

$(CH_3)_3SiO(MeHSiO)_{40}Si(CH_3)_3$

Another preferred class of polymers composed of units represented by Formulas A and B above may be represented by the average formula:

(D) 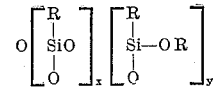

wherein the ratio of $x$ to $y$ may be from 1:10 to 10:1.

For example, if in Formula D, $x=1$, and $y=4$, R in the $x$ unit is ethyl and R in the $y$ unit is amyl, the polysiloxane hereafter labeled Siloxane II is:

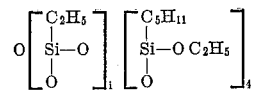

In preparing the single step water repellent composition, which contains both the fluosilicate and polysiloxane, it is convenient to prepare each component as a separate solution first and then to mix them together. The single step water repellent solution may contain from 0.1 to about 5 weight percent fluosilicate, and from 0.1 to about 5.0 weight percent polysiloxane. When a two-step application is used, each solution, i.e. the fluosilicate precoating solution and the silicone water repellent solution should each contain about 0.1 to about 5.0 weight percent of the fluosilicate and silicone respectively. Concentrations lower than 0.1% appear ineffective, while concentrations higher than about 5.0% tend to plug up the pores of the masonry to the point where it becomes impervious to the passage of water vapor which is undesirable where water repellency rather than water proofing is desired.

*Example 1*

A one step coating composition was prepared by dissolving 2 grams of $ZnSiF_6 \cdot 6H_2O$ in 15 grams of water. To this aqueous solution there were then added 23 grams of ethanol and 10 grams of methyl "Cellosolve." The zincfluosilicate solution was then mixed with 50 grams of a 5 percent solution of Siloxane II in mineral spirits. The combined solution, which has a shelf life of about 2 weeks, is suitable for water repelling masonry material. It may be applied by any convenient method such as spraying, coating or dipping.

In order to compare the effectiveness of the present invention with conventional water repellants for masonry, the following solutions labeled A through F were prepared as described below. Each solution was then applied to a test specimen consisting of a 2″ x 2″ x 1″ block of Indiana limestone, whose surface had first been cleaned by wire brushing. The test blocks were coated by being immersed in solutions A, B, C, D and E described below for five seconds, allowed to drain and then air dried for four days prior to testing. Solution F was sprayed on a test block, and after one hour of air drying, the block was immersed in solution E for five seconds and then allowed to air dry for four days prior to testing. The test results are summarized in Tables I and II below.

*Solution A—2% sodium methyl silanolate.*—Solution A is an aqueous solution of sodium methylsilanolate containing 2 percent silicone solids by weight. This is a well known commercially used silicone water repellent.

*Solution B—2% methylhydrogenpolysiloxane.*—Solution B is an aqueous emulsion of Siloxane I containing 2 percent silicone solids by weight. This solution is illustrative of a prior art silicone water repellent emulsion used by itself.

*Solution C—2% methylhydrogenpolysiloxane plus Zn-Sn catalyst.*—Solution C was prepared by mixing 5 grams of a 40 weight percent aqueous emulsion of Siloxane I with a conventional catalyst consisting of 1 gram of an aqueous emulsion containing zinc octoate and dibutyltin diacetate (3.96 percent Zn and 1.36 percent Sn) in 94 grams of water. The solution was prepared by first adding the silozane emulsion to the water and then adding the catalyst. This solution represents a conventional polysiloxane water repellant, catalyzed with conventional catalysts. The solution contains 2% silicone solids.

*Solution D—2% methylhydrogenpolysiloxane plus 3% zincfluosilicate.*—Solution D was prepared by taking 5 grams of a 40 weight percent aqueous emulsion of Siloxane I and mixing it with 3 grams of zincfluosilicate dissolved in 97 grams of water. This composition illustrates the one step water repellent composition of the present invention. It contains 3% zincfluosilicate and 2% silicone solids.

*Solution E—5% amylethylpolysiloxane.*—Solution E is a 5.0 weight percent solution of Siloxane II in mineral spirits. This solution was used for the second step of the two-step coating method.

*Solution F—3% zincfluosilicate.*—Solution F was prepared by dissolving 3 grams of zincfluosilicate in 97 grams of water. This solution was used to precoat masonry, in accordance with the two-step process of this invention, prior to the application of a polysiloxane water repellant. Test block F was then coated with solution E to render it water repellent.

On a water repellent surface, water stands as separate droplets, and covers only a small portion of the surface. At the edges of these droplets the water-air surface forms an angle with the solid surface. This angle is referred to as the "contact angle" and is conventionally used as a measure of the water repellency of a surface. If the angle is 0 the surface is said to be completely wetted. A large contact angle is indicative of good water repellency. The larger the contact angle, the greater the water repellency of the surface.

The contact angle of the test blocks was first measured after the coating had been permitted to air dry for four days at room temperature in order to let the water repellent film become cured. An effective water repellant must be durable in the face of atmospheric weather conditions. In order to measure the durability of the water repellency of the coated test blocks, the contact angle was measured again on a speciment which was subjected to five freeze-thaw cycles and another which was subjected to 140 hours in a Weather-Ometer tester.

Freeze-thaw testing was carried out by immersing the test blocks in water and then freezing them at 0° F., followed by thawing under tap water. Five such cycles of freezing and thawing were performed on each test block. Freeze-thaw testing is a measure of the durability of a water repellent since it is related to the actual conditions of use. The greater the ability of a water repellant to prevent water from penetrating a piece of masonry, the less danger there is of cracking or flaking of the masonry caused by freezing.

The Weather-Ometer testing was carried out by subjecting the test blocks to 140 hours in an Atlas Twin Arc Weather-Ometer in accordance with ASTM method E42-57. This test is an accelerated outdoor life test which subjects the test blocks to repeated cycles of simulated rain and sunshine. One hour in the Weather-Ometer is approximately equivalent to one day of outdoor exposure.

Each test block was also subjected to water absorption tests to determine the resistance of the samples to the penetration and absorption of moisture through the water repellent coating. Water absorption measurements were made by comparing the weight after immersion with the dry tare weight of the sample. Each sample was immersed in water for 24 hours and subjected to ¼ inch head of water. Following the initial water absorption test, the blocks were tested again after being subjected to 140 hours in the Weather-Ometer tester, and another set of samples was tested after being subjected to five freeze-thaw cycles as described above.

A sample with each coating was also rated for its ability to resist staining, wetting and drying.

A good water repellent should not alter the appearance of masonry to which it has been applied. Untreated (uncoated) limestone was arbitrarily given a rating of 0 and sodium methyl silanolate, which is substantially the only commercial silicone used to treat limestone, was rated as 10. The other stain ratings are based on a visual comparison to these two standards. The lower the stain rating the less the appearance of the surface has been altered by the water repellent. All ratings were made after the films had cured.

The "wet-out time" reported in the tables is the time in minutes that it took a droplet of water to wet the coated limestone test block surface. The longer it takes for the water to wet the surface the better the water repellent. A zero wet-out time indicates substantially instantaneous wetting and absorption of the water by the masonry. A long wet-out time is desirable. It will be noted that the surfaces exhibiting the highest contact angle will ordinarily have the longest wet-out time, both being indicative of good water repellency.

The tables below also indicate "recovery time." This is the time required for the surface to return to its natural appearance after the test specimens have been immersed in water for two minutes. The shorter the recovery time the better the water repellent.

Table I below compares various single step water repellent compositions of the prior art (A, B and C) with those of the present invention (D).

TABLE I

| Test Solution | Contact Angle (degrees) | | | Percent Water Absorption | | | Stain Rating | Wet-out Time (min.) | Recovery Time (min.) |
| --- | --- | --- | --- | --- | --- | --- | --- | --- | --- |
| | 4 Day Air Dry | 5 Freeze-Thaw Cycles | 140 Hour Weather-Ometer | Initial | 5 Freeze-Thaw Cycles | 140 Hour Weather-Ometer | | | |
| Control [1] | 0 | 0 | 0 | 3.54 | 3.62 | 3.50 | 0 | 0 | 60 |
| A | 90 | 100 | 100 | 0.55 | 0.53 | 0.24 | 10 | 5 | 8 |
| B | 110 | 100 | 100 | 3.65 | 2.53 | 1.55 | 1 | 5 | 10 |
| C | 115 | 100 | 83 | 3.41 | 1.73 | 1.73 | 1 | 5 | 8 |
| D | 130 | 115 | 115 | 0.51 | 0.09 | 0.09 | 1 | 60 | [2] 0 |

[1] Untreated limestone test specimen. [2] Did not wet at all.

The experimental results shown in Table I demonstrate that the composition of the present invention (solution D) renders limestone surfaces more highly water repellent than conventional prior art silicone water repellents (solutions A, B and C). It can be seen that the composition of the present invention has a considerably greater contact angle than the prior art materials. Furthermore, the improvement in contact angle remains even after the freeze-thaw and Weather-Ometer tests. Thus, it is evident that the present invention yields a durable as well as improved water repellent surface on the limestone masonry. The results also demonstrate that the present invention renders the masonry less adsorbent to water than the prior art materials, and that this decrease in water absorption is retained, in fact improved, with weathering. In addition, the test results show that the compositions of the present invention are superior to the prior art with respect to staining and wetting properties. The present invention stains the masonry very little, thus leaving the surface substantially unaltered in appearance, while, at the same time reducing the wetability of the treated surface to a minimum. In general, the results in Table I demonstrate that the present invention possesses a combination of properties making it a highly superior water repellent for limestone masonry.

Table II below demonstrates the improvement in water repellency which can be achieved by precoating limestone with a fluosilicate solution, in accordance with the two-step process of this invention.

TABLE II

| Test Solution | Contact Angle (degrees) | | Percent Water Absorption | | Stain Rating | Wet-out Time (min.) | Recovery Time (min.) |
|---|---|---|---|---|---|---|---|
| | 4 Day Air Dry | 140 Hr. Weather-Ometer | Initial | 140 Hr. Weath-er-Ometer | | | |
| Control [1] | 0 | 0 | 3.54 | 3.50 | 0 | 0 | 60 |
| E | 68 | 95 | 3.12 | 3.15 | 1 | 0 | 4 |
| F | 103 | 115 | 1.52 | 1.66 | 1 | 40 | 8 |

[1] Untreated limestone test specimen.

The results in Table II compare the effect of precoating a limestone surface with a zincfluosilicate solution in accordance with the two-step method of this invention. It can be seen that the precoated block (F) has a much greater contact angle and much lower water absorption, both before and after weathering than the same surface treated with the same silicone water repellent (E) but having had no zincfluosilicate precoating. In addition, the sample treated in accordance with this invention shows considerable improvement in wetability properties. Thus, the results in Table II clearly demonstrate the improvement in water repellency obtainable by precoating limestone masonry with a fluosilicate solution prior to the application of a conventional silicone water repellent in accordance with the two-step method of this invention.

It should be apparent that if colored rather than clear coatings are desirable, conventional dyes and pigments may be added to the coating compositions of this invention.

What is claimed is:
1. A composition suitable for rendering masonry surfaces water repellent, comprising (1) a major amount of a liquid diluent (2) a minor amount of a water soluble fluosilicate compound, and (3) a minor amount of a polysiloxane consisting essentially of
   (a) 5 to 100 mole percent of units represented by the structural formula

$$R_a SiO_{\frac{4-(a+b)}{2}}^{X_b}$$

and
   (b) 0 to 95 mole percent of units represented by the structural formula $$R_c SiO_{\frac{4-c}{2}}$$

wherein R is a monovalent hydrocarbon group, X is selected from the group consisting of H, OH, and OR groups, $a$ has a value of 1 to 2 inclusive, $b$ has a value of 1 to 2 inclusive, the sum of $(a+b)$ has a value of 2 to 3 inclusive, and $c$ has a value of 1 to 3 inclusive.

2. A composition suitable for rendering masonry surfaces water repellent, comprising (1) a major amount of a liquid diluent (2) a minor amount of a water soluble fluosilicate compound, and (3) a minor amount of a polysiloxane consisting essentially of
   (A) 5 to 100 mole percent of units represented by the structural formula $$R_a SiO_{\frac{4-(a+b)}{2}}^{X_b}$$

and
   (a) 0 to 95 mole percent of units represented by the structural formula $$R_c SiO_{\frac{4-c}{2}}$$

wherein R is a monovalent saturated aliphatic hydrocarbon group containing 1 to 5 carbon atoms, X is selected from the group consisting of H, OH and OR groups, $a$ has a value of 1 to 2 inclusive, $b$ has a value of 1 to 2 inclusive, the sum of $(a+b)$ has a value of 2 to 3 inclusive, and $c$ has a value of 1 to 3 inclusive.

3. A composition suitable for rendering masonry water repellent, comprising (1) a major amount of a liquid diluent (2) a minor amount of a water soluble fluosilicate compound and (3) a minor amount of a polysiloxane represented by the formula $$R_3SiO(R_2SiO)_n(RHSiO)_mSiR_3$$

where R is a monovalent saturated aliphatic hydrocarbon group containing from 1 to 5 carbon atoms, $n$ has any average value of from 0 to 5000, $m$ has any average value of from 1 to about 300, and wherein at least 5 mole percent of the siloxane groups are RHSiO groups.

4. The composition of claim 2 wherein the polysiloxane is represented by the average formula $$(CH_3)_3SiO(CH_3HSiO)_{40}Si(CH_3)_2$$

5. The composition of claim 2, wherein the polysiloxane is represented by the average formula $$O\left[\begin{array}{c}C_2H_5\\|\\Si-O\\|\\O\end{array}\right]_1\left[\begin{array}{c}C_5H_{11}\\|\\Si-OC_2H_5\\|\\O\end{array}\right]_4$$

6. The composition of claim 2 wherein the diluent is water.

7. The composition of claim 2 wherein the diluent is an organic solvent.

8. The composition of claim 2 wherein the amount of polysiloxane present is from 0.1 to about 5 weight percent.

9. The composition of claim 2 wherein the amount of uosilicate compound present is from 0.1 to about 5 weight percent.

10. The composition of claim 2 wherein the fluosilicate compound is zincfluosilicate.

11. An aqueous composition suitable for rendering masonry water repellent, comprising (1) 0.1 to about 5 weight percent zincfluosilicate and (2) 0.1 to about 5 weight percent of a polysiloxane represented by the formula $$R_3SiO(R_2SiO)_n(RHSiO)_mSiR_3$$

where R is a monovalent saturated aliphatic hydrocarbon group containing from 1 to 5 carbon atoms, $n$ has any average value of from 0 to 5000, $m$ has any average value of from 1 to about 300, and wherein at least 5 mole percent of the siloxane groups are RHSiO groups.

12. An aqueous composition suitable for rendering masonry water repellent, comprising (1) 0.1 to about 5 weight percent zincfluosilicate and (2) 0.1 to about 5 weight percent of a polysiloxane represented by the structural formula

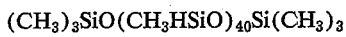

13. A composition suitable for rendering masonry water repellent, comprising (1) an organic solvent (2) 0.1 to about 5 weight percent zincfluosilicate and (3) 0.1 to about 5 weight percent of a polysiloxane represented by the average formula

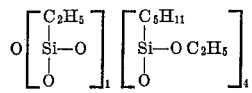

14. A process for rendering masonry surfaces water repellent comprising applying to a masonry surface in the presence of a fluosilicate compound, a composition comprising (1) a major amount of a liquid diluent and (2) a minor amount of a polysiloxane consisting essentially of
(a) 5 to 100 mole percent of units represented by the structural formula

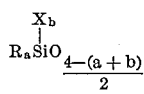

and
(b) 0 to 95 mole percent of units represented by the structural formula

where R is a monovalent hydrocarbon group, X is selected from the group consisting of H, OH and OR groups, $a$ has a value of 1 to 2 inclusive, $b$ has a value of 1 to 2 inclusive, the sum of $(a+b)$ has a value of 2 to 3 inclusive, and $c$ has a value of 1 to 3 inclusive.

15. A process for rendering masonry surfaces water repellent comprising applying to a masonry surface a composition comprising:
(1) a major amount of a liquid diluent
(2) a minor amount of a water soluble fluosilicate compound, and
(3) a minor amount of a polysiloxane consisting essentially of
(a) 5 to 100 mole percent of units represented by the structural formula

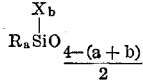

and
(b) 0 to 95 mole percent of units represented by the structural formula

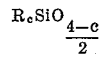

wherein R is a monovalent hydrocarbon group, X is selected from the group consisting of H, OH and OR groups, $a$ has a value of 1 to 2 inclusive, $b$ has a value of 1 to 2 inclusive, the sum of $(a+b)$ has a value of 2 to 3 inclusive, and $c$ has a value of 1 to 3 inclusive.

16. The process of claim 15 wherein the masonry surface is limestone.

17. A process for rendering limestone masonry surfaces water repellent comprising applying to a masonry surface a composition comprising (1) a major amount of a liquid diluent (2) a minor amount of a water soluble fluosilicate compound, and (3) a minor amount of a polysiloxane represented by the structural formula

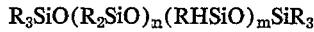

where R is a monovalent saturated aliphatic hydrocarbon group containing from 1 to 5 carbon atoms, $n$ has any average value of from 0 to 5000, $m$ has any average value of from 1 to about 300, and wherein at least 5 mole percent of the silicone groups are RHSiO groups.

18. The process of claim 17 wherein the polysiloxane is represented by the formula

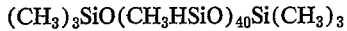

19. The process of claim 17 wherein the polysiloxane is represented by the formula

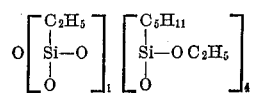

20. The process of claim 17 wherein the diluent is water.

21. The process of claim 17 wherein the diluent is an organic solvent.

22. The process of claim 17 wherein the fluosilicate compound is zincfluosilicate.

23. A process for rendering masonry water repellent comprising:
(A) applying to a masonry surface a composition comprising a major amount of a liquid diluent and a minor amount of a water soluble fluosilicate compound
(B) drying said fluosilicate coated surface, and
(C) applying to said fluosilicate coated surface a composition comprising a major amount of a liquid diluent and a minor amount of a polysiloxane consisting essentially of
(a) 5 to 100 mole percent of units represented by the structural formula

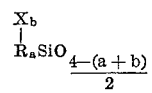

and
(b) 0 to 95 mole percent of units represented by the structural formula

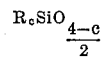

where R is a monovalent hydrocarbon group, X is selected from the group consisting of H, OH and OR groups, $a$ has a value of 1 to 2 inclusive, $b$ has a value of 1 to 2 inclusive, the sum of $(a+b)$ has a value of 2 to 3 inclusive, and $c$ has a value of 1 to 3 inclusive.

24. The process of claim 23 wherein the masonry surface is limestone.

25. A process for rendering limestone masonry water repellent comprising
(A) applying to a masonry surface a composition comprising a major amount of a liquid diluent and a minor amount of a water soluble fluosilicate compound
(B) drying said fluosilicate coated surface, and
(C) applying to said fluosilicate coated surface a composition comprising a major amount of a liquid diluent and a minor amount of a polysiloxane represented by the structural formula

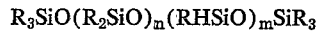

where R is a monovalent saturated aliphatic hydrocarbon group containing from 1 to 5 carbon atoms, $n$ has any average value of from 0 to 5000, $m$ has any average value of from 1 to about 300, and wherein at least 5 mole percent of the siloxane groups are RHSiO groups.

26. The process of claim 25 wherein the polysiloxane is represented by the formula

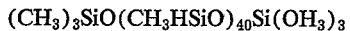

27. The process of claim 25 wherein the polysiloxane is represented by the formula

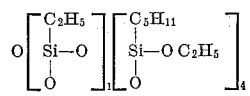

28. The process of claim 25 wherein the diluent is water.

29. The process of claim 25 wherein the diluent is an organic solvent.

30. The process of claim 25 wherein the fluosilicate compound is zincfluosilicate.

References Cited

UNITED STATES PATENTS 2,982,674   5/1961   Gancberg _____ 177—161
3,058,936   10/1962  Leclercq _____ 260—29.2

FOREIGN PATENTS 647,158   8/1962   Canada.

MURRAY TILLMAN, *Primary Examiner.*

J. C. BLEUTGE, *Assistant Examiner.*